No. 668,383. Patented Feb. 19, 1901.
C. MILLER.
WHEEL BUSHING.
(Application filed May 15, 1900.)
(No Model.)
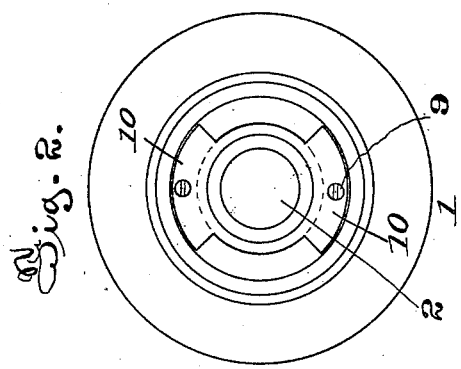
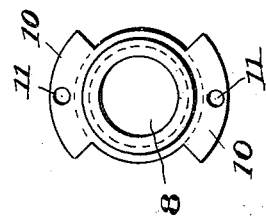
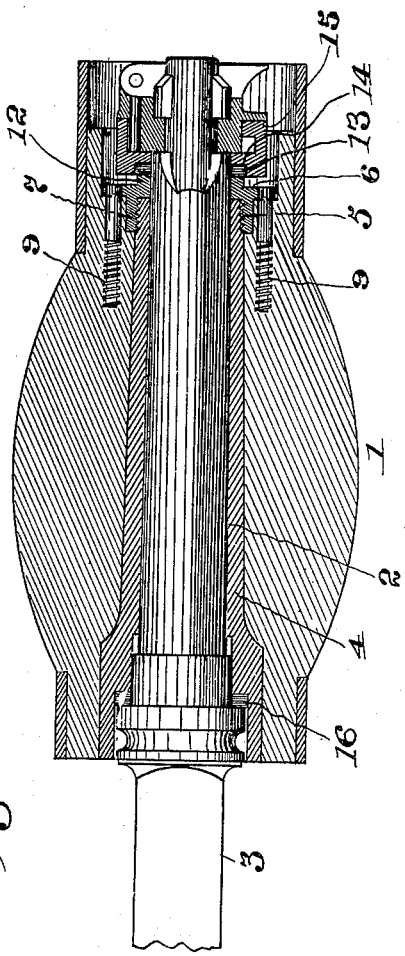
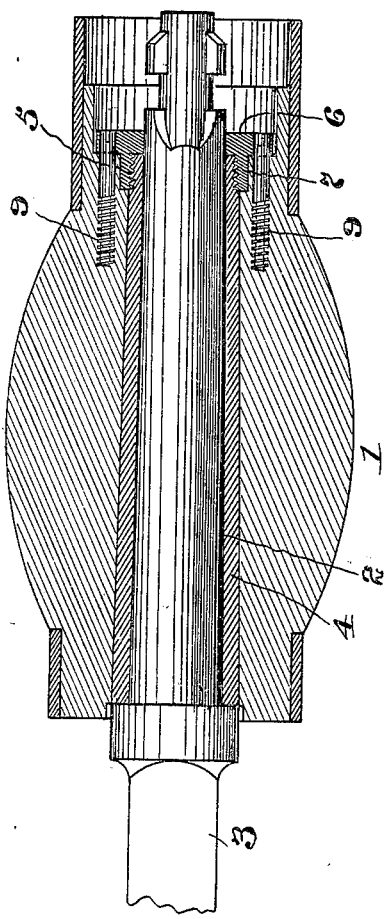
Witnesses
Marcus L. Byng.
Chas L. Wallace
Inventor
Conrad Miller
by _____ Attorney

UNITED STATES PATENT OFFICE.

CONRAD MILLER, OF LEADVILLE, COLORADO.

WHEEL-BUSHING.

SPECIFICATION forming part of Letters Patent No. 668,383, dated February 19, 1901.

Application filed May 15, 1900. Serial No. 16,777. (No model.)

*To all whom it may concern:*

Be it known that I, CONRAD MILLER, a citizen of the United States, residing at Leadville, in the county of Lake and State of Colorado, have invented certain new and useful Improvements in Wheel-Bushings; and I do hereby declare the following to be a full, clear, and exact description of the invention, such as will enable others skilled in the art to which it appertains to make and use the same.

This invention relates to improvements in wheel-hubs, and more particularly relates to an improved construction of bushing for the same.

The object of the invention is to provide a bushing of the character stated which is so constructed as to be capable of extension longitudinally of the wheel-hub, whereby wear upon the bushing incident to its work upon the axle-spindle may be easily compensated for and proper fitting of the parts in their relative positions insured at all times.

With this and other objects in view, which will appear as the nature of the improvements is better understood, the invention consists substantially in the novel construction, combination, and arrangement of parts, as will be hereinafter fully described, illustrated in the accompanying drawings, and pointed out in the appended claims.

In the drawings, Figure 1 is a longitudinal sectional view of a wheel-hub provided with a bushing constructed in accordance with the present invention. Fig. 2 is an end elevation thereof. Fig. 3 is a front elevation of the adjusting-nut carried by the bushing. Fig. 4 is a longitudinal sectional view of a hub provided with another form of the invention.

Referring to the drawings, the numeral 1 designates a hub, which is of the ordinary construction, said hub being mounted upon the spindle 2 of an axle 3, the latter being of the type usually employed with buggies and similar light vehicles. Arranged within the bore of the hub 1 is a longitudinally-extending bushing 4, which bushing is driven into the hub 1 in the usual manner, and said bushing is provided at its outer end with a series of exterior screw-threads 5. An adjusting-nut 6 is mounted upon the threaded end of the bushing 2, said nut being provided with an inwardly-extending annular flange 7, having interior screw-threads engaging with the threads 5 of the bushing. It will be observed, however, that the flange 7 is spaced a sufficient distance from the opening 8 of the nut to accommodate the thickness of the bushing 4 between itself and the spindle 2, and, further, that the portion of the nut immediately surrounding said opening lies against the outer end of the bushing, and thereby protects the same from wear, the latter being taken up by the adjusting-nut 6. It is for the purpose, however, of compensating for wear upon the bushing incident to the work of the latter upon the spindle that the nut 6 is provided, and to this end, when said bushing has become loose upon the spindle 2, the same may be readily tightened by unscrewing the nut 6, thereby lengthening the bushing 4, and forcing the same farther up on the spindle 2 in order to obtain a tighter fit thereon. In this movement the nut 6 always remains in the same relation to the outer end of the hub 1, and for the purpose of locking the nut 6 against displacement from the position to which the same has been adjusted headless screws 9 are passed through said nut and into the hub. The nut 6 is provided with diametrically opposite wings 10, each of which has an opening 11 for receiving one of the screws 9, and said wings extend beyond the flange 7 and abut against the outer end of the hub, whereby the unchanged relation of the nut 6 to said hub during adjustment is effected. By reason of the wings 10 being arranged diametrically opposite spaces are provided at opposite sides of the nut 6, in which a wrench or other suitable tool may be applied, and said wrench or tool may thereby be easily engaged with the wings 10 for rotating the nut 6.

It will be further observed that the nut 6 has at its outer face and encircling the opening 8 an annular rib 12, which rib, together with a flexible washer 13, such as leather, fits within a recess 14, formed in the inner face of a hub-attaching device 15, mounted upon the outer extremity of the spindle 2. A flexible washer 16, of leather or the like, is also interposed between the inner end of the bushing 4 and the shoulder of the axle 3 to insure against rattling. The hub-attaching device 15 is of especial construction and forms the subject-matter of a separate application for patent of even date herewith.

In Fig. 4 is shown a hub having another form of the invention, and by referring thereto it will be seen that the essential features of the form shown in Fig. 1 are retained, the only difference being that the annular rib 12 of the nut 6 is dispensed with in order that the hub-attaching device may lie flush against the outer face of said nut. The hub and axle shown in Fig. 4 are of the type usually employed with heavy vehicles, such as express-wagons and the like.

The manner of adjusting the herein-described bushing will be readily understood, and, as before stated, in the event of wear sufficient to require renewed fitting of the several parts in their relation to each other the screws 9 are removed, a wrench or other suitable tool applied to the nut 6, and the latter unscrewed sufficiently to permit the bushing 4 being moved upon the spindle 2 to the necessary extent for obtaining a proper fit of said bushing upon said spindle. When this has been accomplished, the screws 9 are again passed through the wings 10 into the hub 1, and hence it is obvious that the nut 6 is locked against rotation upon the bushing and the latter held in its adjusted position. Wear, therefore, can be constantly taken up and a proper fit insured at all times.

Having thus described the invention, what is claimed as new, and desired to be secured by Letters Patent, is—

1. The combination with a hub, of a bushing arranged therein and having one of its ends screw-threaded, an adjusting-nut mounted on said threaded end for extending the bushing longitudinally of the hub, said nut being provided with oppositely-extending wings adapted to be engaged by a suitable tool for rotating the nut, and screws passing through said wings and engaging the hub for locking the nut in its adjusted positions.

2. The combination with a hub, of a bushing arranged therein and having one of its ends screw-threaded, an adjusting-nut mounted on said threaded end for extending the bushing longitudinally of the hub, said nut being provided with an inwardly-extending flange encircling the end of the bushing, and also having oppositely-extending wings adapted to be engaged by a suitable tool for rotating said nut, the portion of said nut surrounding its opening lying against the end of the bushing for protecting the latter against wear, and means for locking the nut in its adjusted positions.

3. The combination with a hub, of a bushing arranged therein and having one of its ends screw-threaded, an adjusting-nut mounted on said threaded end for extending the bushing longitudinally of the hub, said nut being provided with an inwardly-extending flange encircling the end of the bushing, and also having oppositely-extending wings adapted to be engaged by a suitable tool for rotating said nut, the portion of said nut surrounding its opening lying against the end of the bushing for protecting the latter against wear, and screws passing through the wings of said nut and engaging the hub for locking the nut in its adjusted positions.

In testimony whereof I affix my signature in the presence of two witnesses.

CONRAD MILLER.

Witnesses:
KNUD RASMUSSEN,
JOHN LAW.